United States Patent [19]

Ogawa et al.

[11] Patent Number: 5,360,269
[45] Date of Patent: Nov. 1, 1994

[54] IMMERSION-TYPE TEMPERATURE MEASURING APPARATUS USING THERMOCOUPLE

[75] Inventors: Koji Ogawa, Kasugai; Hiroshi Suzuki, Tajimi, both of Japan

[73] Assignee: Tokyo Kogyo Kabushiki Kaisha, Tokyo, Japan

[21] Appl. No.: 151,532

[22] Filed: Nov. 12, 1993

[51] Int. Cl.$^5$ .............................................. G01K 1/12
[52] U.S. Cl. .................................... 374/140; 374/208; 136/234
[58] Field of Search ............... 374/139, 140, 179, 208; 136/234, 232, 230

[56] References Cited

U.S. PATENT DOCUMENTS

| 3,106,493 | 10/1963 | Japka | 374/139 X |
| 3,232,794 | 2/1966 | Korton | 374/179 X |
| 3,661,749 | 5/1972 | Richardson | 374/140 X |
| 4,721,533 | 1/1988 | Phillippi et al. | |
| 4,746,534 | 5/1988 | Phillippi et al. | 427/37 |
| 4,748,915 | 6/1988 | Hastings et al. | 109/2 |
| 4,749,416 | 6/1988 | Greenspan | 136/232 |

FOREIGN PATENT DOCUMENTS

| 2154185 | 5/1973 | France . |
| 3022189A1 | 12/1981 | Germany . |
| 1137432 | 4/1966 | United Kingdom . |
| 1151019 | 5/1969 | United Kingdom . |

OTHER PUBLICATIONS

Patent Abstracts of Japan; vol. 10, No. 53; (P-433) (2110); Mar. 4, 1986; & JP-A-60-198 423 (Kawasaki Seitetsu) Oct. 7, 1985.

Primary Examiner—William A. Cuchlinski, Jr.
Assistant Examiner—Willie Morris Worth
Attorney, Agent, or Firm—Frishauf, Holtz, Goodman & Woodward

[57] ABSTRACT

An immersion-type temperature measuring apparatus using a thermocouple for measuring temperature of a melt, which comprises: a replaceable cartridge-type temperature sensor (11) for detecting a thermoelectromotive force corresponding to a temperature of a melt, the temperature sensor (11) comprising a thermocouple (13), a protecting tube (12) for protecting the thermocouple (13) from the melt, and a connector (16); a holder for releasably supporting the temperature sensor (11); a measuring instrument (28) for processing the thermoelectromotive force to determine the temperature of the melt; and an extension lead wire (25) for connecting the temperature sensor (11) with the measuring instrument (28). At least part of the above-mentioned protecting tube (12) is formed of a molybdenum-zirconia refractory consisting essentially of from 20 to 95 wt. % molybdenum and from 5 to 80 wt. % zirconia.

4 Claims, 3 Drawing Sheets

FIG. 1
(PRIOR ART)
FIG. 2
(PRIOR ART)
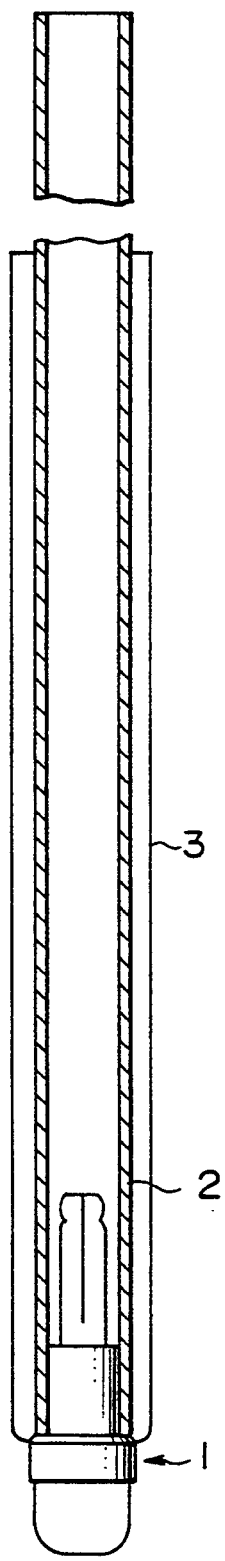
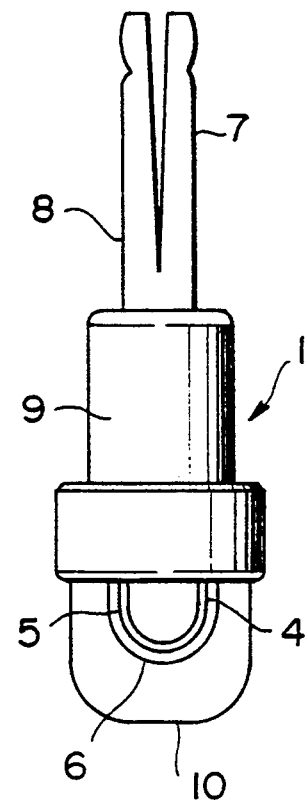

IMMERSION-TYPE TEMPERATURE MEASURING APPARATUS USING THERMOCOUPLE

BACKGROUND OF THE INVENTION

1. Field of the Invention

The present invention relates to an immersion-type temperature measuring apparatus using a thermocouple, for measuring temperature of a melt such as a molten metal or a molten slag in a furnace such as an induction heating furnace.

2. Related Art Statement

Temperature of a melt such as a molten metal or a molten slag in a furnace such as an induction heating furnace exerts an important effect on operations and product quality. It is therefore necessary to periodically measure temperature of a melt such as a molten metal or a molten slag in a furnace such as an induction heating furnace.

For the purpose of measuring temperature of a molten metal in a furnace, an immersion-type temperature measuring apparatus using a thermocouple as shown in FIGS. 1 and 2 has widely been employed. FIG. 1 is a schematic vertical sectional view illustrating part of a conventional immersion-type temperature measuring apparatus using a thermocouples for measuring temperature of a melt. In FIG. 1, 1 is a temperature sensor, 2 is a paper tube, and 3 is a ceramic fiber tube. The paper tube 2 is covered with the ceramic fiber tube 3 which is a heat-insulator, and is formed integrally with the temperature sensor 1. FIG. 2 is a schematic vertical sectional view illustrating details of the above-mentioned temperature sensor 1. In FIG. 2, combination of 4 and 5 is a thermocouple comprising platinum and a platinum-rhodium alloy, 6 is a quartz glass protecting tube for protecting the thermocouple 4, 5 from a melt such as a molten metal or a molten slag, combination of 7 and 8 is an extension lead wire for connecting the thermocouple 4, 5 with a measuring instrument not shown, 9 is a housing for receiving a junction between the thermocouple 4, 5 and the extension lead wire 7, 8, and 10 is a cap made of iron or aluminum, having at least one through-hole, for protecting the quartz glass protecting tube 6 from a melt such as a molten metal or a molten slag. As shown in FIG. 1, furthermore, the housing 9 and the extension lead wire 7, 8 are protected by the paper tube 2 and the ceramic fiber tube 3, which have a heat-insulating function.

By means of the above-mentioned conventional immersion-type temperature measuring apparatus using the thermocouple, temperature of a molten metal is measured as follows.

An upper portion of the paper tube 2 of the conventional immersion-type temperature measuring apparatus using the thermocouple as shown in FIG. 1, is vertically supported by means of a holder not shown. A portion of the temperature sensor 1 covered with the cap 10 vertically descends toward a molten metal by actuating a lift not shown, and is immersed into the molten metal. When the portion of the temperature sensor 1 covered with the cap 10 is immersed into the molten metal, the molten metal penetrating into the cap 10 through at least one through-hole thereof comes into contact with the quartz glass protecting tube 6. A thermoelectromotive force corresponding to temperature of the molten metal is detected by the thermocouple 4, 5 covered with the quartz glass protecting tube 6, and temperature of the molten metal is determined by a measuring instrument not shown through the extension lead wire 7, 8 (hereinafter referred to as the "prior art").

The prior art has however the following problems.

The quartz glass protecting tube 6 covering the thermocouple 4, 5, while having a high thermal shock resistance, has a low erosion resistance to a molten metal, leading to rapid erosion of the protecting tube 6 when immersed into the molten metal. Consequently, a first run of measurement for a short period of time causes the molten metal to penetrate into the protecting tube 6, thus resulting in break-down of the thermocouple 4, 5. It is therefore necessary to replace the temperature sensor 1, the paper tube 2 and the ceramic fiber tube 3 after every run of measurement. This requires much time for a replacement operation and is therefore uneconomical.

Under such circumstances, there is a strong demand for development of an immersion-type temperature measuring apparatus using a thermocouple, which permits multiple runs of measurement of temperature of a melt such as a molten metal or a molten slag in a furnace such as an induction heating furnace for a long period of time with the use of a single temperature sensor, and easy replacement of the temperature sensor, but such an immersion-type temperature measuring apparatus has not as yet been proposed.

SUMMARY OF THE INVENTION

An object of the present invention is therefore to provide an immersion-type temperature measuring apparatus using a thermocouple, which permits multiple runs of measurement of temperature of a melt such as a molten metal or a molten slag in a furnace such as an induction heating furnace for a long period of time with the use of a single temperature sensor, and easy replacement of the temperature sensor.

In accordance with one of the features of the present invention, in an immersion-type temperature measuring apparatus using a thermocouple for measuring temperature of a melt, which comprises:

a replaceable cartridge-type temperature sensor (11) for detecting a thermoelectromotive force corresponding to a temperature of a melt, said temperature sensor (11) comprising a thermocouple (13), a protecting tube (12), covering at least a lower portion of said thermocouple (13), for protecting said thermocouple (13) from said melt, and a connector (16);

a holder (26) for releasably supporting said temperature sensor (11);

a measuring instrument (28) for processing said thermoelectromotive force detected by said temperature sensor (11) to determine the temperature of said melt; and an extension lead wire (25), arranged through said holder (26), for connecting said temperature sensor (11) with said measuring instrument (28), said extension lead wire (25) being connected with said temperature sensor (11) through said connector;

there is provided the improvement wherein;

at least part of said protecting tube (12) is formed of a molybdenum-zirconia (Mo-ZrO$_2$) refractory which consists essentially of:

molybdenum (Mo): from 20 to 95 wt. %, and zirconia (ZrO$_2$): from 5 to 80 wt. %.

BRIEF DESCRIPTION OF THE DRAWINGS

FIG. 1 is a schematic vertical sectional view illustrating part of a conventional immersion-type temperature measuring apparatus using a thermocouple for measuring a temperature of a melt;

FIG. 2 is a schematic vertical sectional view illustrating details of the temperature sensor of the conventional immersion-type temperature measuring apparatus as shown in FIG. 1;

DETAILED DESCRIPTION OF PREFERRED EMBODIMENTS

Figure 3:
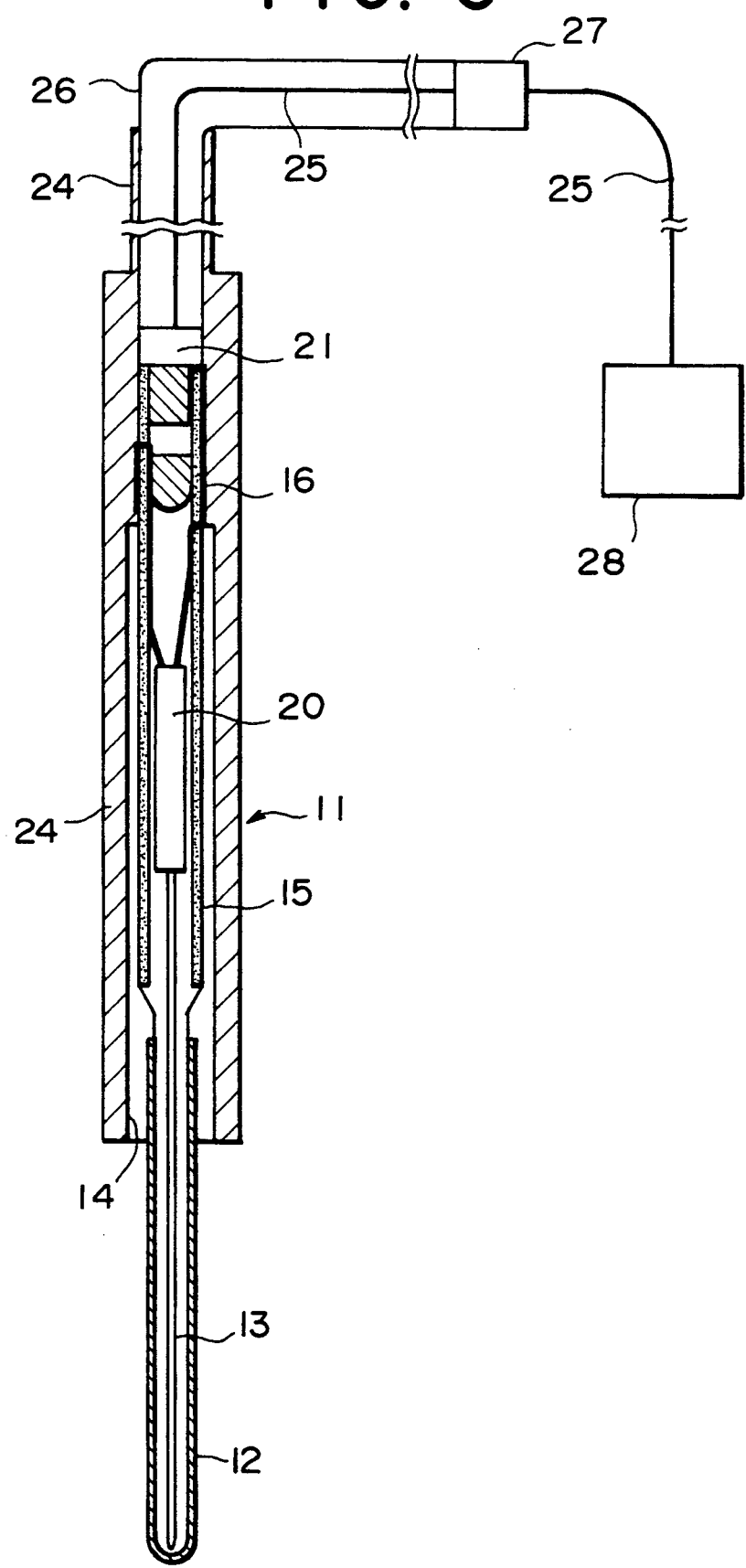
FIG. 3 is a schematic vertical sectional view illustrating a first embodiment of the cartridge-type temperature sensor of the immersion-type temperature measuring apparatus of the present invention using a thermocouple for measuring a temperature of a melt.

From the above-mentioned point of view, extensive studies were carried out to develop an immersion-type temperature measuring apparatus using a thermocouple, which permits multiple runs of measurement of temperature of a melt such as a molten metal or a molten slag in a furnace such as an induction heating furnace for a long period of time with the use of a single temperature sensor, and easy replacement of the temperature sensor.

As a result, the following findings were obtained: It is possible to obtain a protecting tube for a temperature sensor, which is excellent in thermal shock resistance and erosion resistance, thus permitting multiple runs of measurement of temperature of a melt such as a molten metal or a molten slag in a furnace such as an induction heating furnace for a long period of time with the use of a single temperature sensor, by forming the protecting tube with a molybdenum-zirconia (Mo-ZrO$_2$) refractory consisting essentially of:

molybdenum (Mo): from 20 to 95 wt. %, and
zirconia (ZrO$_2$): from 5 to 80 wt. %.

The present invention was made on the basis of the above-mentioned findings, and the immersion-type temperature measuring apparatus of the present invention using a thermocouple for measuring temperature of a melt comprises:

a replaceable cartridge-type temperature sensor (11) for detecting a thermoelectromotive force corresponding to temperature of a melt, said temperature sensor (11) comprising a thermocouple (13), a protecting tube (12), covering at least a lower portion of said thermocouple (13), for protecting said thermocouple (13) from said melt, and a connector (16);

a holder (26) for releasably supporting said temperature sensor (11);

a measuring instrument (28) for processing said thermoelectromotive force detected by said temperature sensor (11) to determine the temperature of said melt; and an extension lead wire (25), arranged through said holder (26), for connecting said temperature sensor (11) with said measuring instrument (28), said extension lead wire (25) being connected with said temperature sensor (11) through said connector (16); and wherein at least part of said protecting tube (12) is formed of a molybdenum-zirconia (Mo-ZrO$_2$) refractory which consists essentially of:

molybdenum (Mo): from 20 to 95 wt. %, and
zirconia (ZrO$_2$): from 5 to 80 wt. %.

The reasons why the chemical composition of the molybdenum-zirconia refractory forming the protection tube of the immersion-type temperature measuring apparatus of the present invention using a thermocouple for measuring temperature of a melt such as a molten metal or a molten slag is limited as mentioned above, are described hereunder.

(1) Molybdenum:

Molybdenum (Mo) has a function of improving thermal conductivity of the refractory forming the protecting tube to raise response of the temperature sensor. Furthermore, molybdenum has a function of improving thermal shock resistance of the refractory forming the protecting tube. With a molybdenum content of under 20 wt. % however, a desired effect as mentioned above is unavailable. With a molybdenum content of over 95 wt. %, on the other hand, there occur the oxidation of metallic molybdenum and the dissolution thereof into a molten metal, this causing deterioration of the refractory forming the protecting tube and damage thereto. The molybdenum content should therefore be limited within a range of from 20 to 95 wt. %.

(2) Zirconia:

Zirconia (ZrO$_2$) has a function of improving erosion resistance of the refractory forming the protecting tube. With a zirconia content of under 5 wt. %, however, a desired effect as mentioned above is unavailable. With a zirconia content of over 80 wt. %, on the other hand, thermal shock resistance of the refractory forming the protecting tube is deteriorated, causing a thermal spalling defect in the protecting tube. The zirconia content should therefore be limited within a range of from 5 to 80 wt. %.

Now, the immersion-type temperature measuring apparatus of the present invention using a thermocouple for measuring temperature of a melt such as a molten metal or a molten slag, is described with reference to drawings.

FIG. 3 is a schematic vertical sectional view illustrating a first embodiment of the cartridge-type temperature sensor of the immersion-type temperature measuring apparatus of the present invention using a thermocouple for measuring temperature of a melt such as a molten metal or a molten slag.

As shown in FIG. 3, the immersion-type temperature measuring apparatus of-the present invention comprises a cartridge-type temperature sensor 11, an extension lead wire 25 and a measuring instrument 28. The temperature sensor 11 comprises a thermocouple 13, a protecting tube 12, a mica sleeve 15, a stainless steel sleeve 14, a heat insulator 24, a housing 20 and a connector 16. The whole of the thermocouple 13 is enveloped in any one of a magnesia (MgO) refractory and an alumina ($Al_2O_3$) refractory, or the whole of the thermocouple 13 thus enveloped in the magnesia refractory or the alumina refractory is further covered with a stainless steel tube (hereinafter referred to as the "sheathed thermocouple"). The sheathed thermocouple 13 is further covered with the protecting tube 12 formed of the molybdenum-zirconia (Mo-$ZrO_2$) refractory having the chemical composition as described above. The mica sleeve 15 is provided above the protecting tube 12 and ajacent thereto, so as to surround an upper portion of the sheathed thermocouple 13. Furthermore, the stainless steel sleeve 14 is provided so as to surround an upper portion of the protecting tube 12 and the whole of the mica sleeve 15. In addition, the heat insulator 24 is provided over the outside of the stainless steel sleeve 14.

A holder 26 comprising a stainless steel tube is provided above the temperature sensor 11, and a lower end portion 21 of the holder 26 is inserted into an upper end portion of the temperature sensor 11. The cartridge type temperature sensor 11 is thus releasably and vertically supported by means of the holder 26. An upper end portion of the holder 26 is provided with another connector 27.

Figure 6:
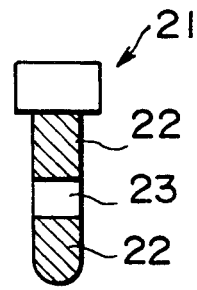
FIG. 6 is a schematic vertical sectional view illustrating details of a lower end portion of a holder, which is inserted into an upper end portion of the cartridge-type temperature sensor as shown in FIGS. 3 and 4 of the immersion-type temperature measuring apparatus the present invention.

The sheathed thermocouple 13 covered with the protecting tube 12 is connected with the connector 16 comprising two copper wires in the housing 20 received in the mica sleeve 15. The copper wires of the connector 16 are individually secured to the mica sleeve 15 as shown by the thick lines in FIG. 3. The lower end portion 21 of the holder 26 inserted into the mica sleeve 15, which forms the upper portion of the temperature sensor 11, comprises, as shown in FIG. 6, an electric conductor 22 comprising copper and the like shown by the hatching and an electric insulator 23.

When the protecting tube 12 is immersed into a melt by actuating a lift not shown, a thermoelectromotive force corresponding to temperature of the melt is detected by means of the sheathed thermocouple 13 received in the protecting tube 12, and temperature of the melt is determined by the measuring instrument 28 through the housing 20, the connector 16, the lower end portion 21 of the holder 26, and the extension lead wire 25.

Since the cartridge-type temperature sensor 11 is releasably connected with the lower end portion 21 of the holder 26 through the connector 16, as described above, the cartridge-type temperature sensor 11 having the protecting tube 12 which is immersed into the melt, can easily be replaced. The holder 26, including the lower end portion 21 thereof, can thus be used almost permanently.

Figure 4:
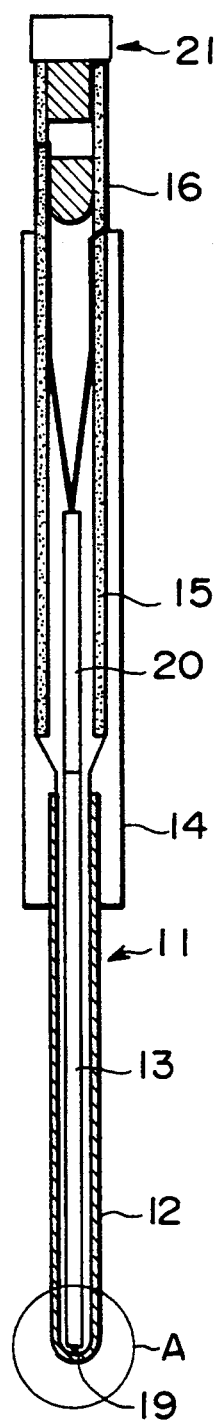
FIG. 4 is a schematic vertical sectional view illustrating a second embodiment of the cartridge-type temperature sensor of the immersion-type temperature measuring apparatus of the present invention using a thermocouple for measuring temperature of a melt.
Figure 5:
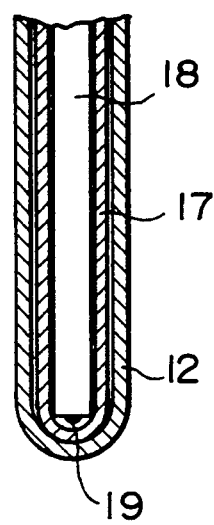
FIG. 5 is a schematic vertical sectional view illustrating details of a portion indicated by "A" in the cartridge-type temperature sensor of the second embodiment as shown in FIG. 4 of the immersion-type temperature measuring apparatus of the present invention.

FIG. 4 is a schematic vertical sectional view illustrating a second embodiment of the cartridge-type temperature sensor of the immersion-type temperature measuring apparatus of the present invention using a thermocouple for measuring temperature of a melt such as a molten metal or a molten slag; and FIG. 5 is a schematic vertical sectional view illustrating details of a portion indicated by "A" in, the cartridge-type-temperature sensor of the second embodiment as shown in FIG. 4. As shown in FIGS. 4 and 5, the thermocouple 13 of the cartridge-type temperature sensor 11 of the second embodiment is covered with an alumina ($Al_2O_3$) refractory tube 18, except for a tip portion 19 of the thermocouple 13. As required, furthermore, an alumina ($Al_2O_3$) refractory protecting tube 17 is provided, as shown in FIG. 5, between the molybdenum-zirconia (Mo-$ZrO_2$) refractory protecting tube 12 and the alumina ($Al_2O_3$) refractory tube 18. The above-mentioned protecting tube 12 may comprise an outer layer comprising the molybdenum-zirconia (Mo-$ZrO_2$) refractory, having the chemical composition as described above, and an inner layer comprising an alumina ($Al_2O_3$) refractory. The cartridge-type temperature sensor 11 of the second embodiment as shown in FIGS. 4 and 5 is substantially identical with the cartridge-type temperature sensor 11 as shown in FIG. 3, except for the difference described above.

According to the above-mentioned immersion-type temperature measuring apparatus of the present invention, it is possible to carry out multiple runs of measurement of temperature of a melt such as a molten metal or a molten slag in a furnace such as an induction heating furnace for a long period of time with the use of a single temperature sensor, and to easily replace the temperature sensor.

Now, the immersion-type temperature measuring apparatus of the present invention as described further in detail by means of examples while comparing with comparative examples.

EXAMPLES

There were prepared temperature sensors 11 within the scope of the present invention as shown in FIGS. 4 and 5 (hereinafter referred to as the "samples of the invention") Nos. 1, 2 and 4, each of which comprised a protecting tube 12 made of a molybdenum-zirconia (Mo-$ZrO_2$) refractory having a chemical composition within the scope of the present invention as shown in Table 1 and having dimensions including a length of 80 mm, an outside diameter of 6 mm and an inside diameter of 4 mm, a thermocouple 13 comprising platinum and a platinum-rhodium alloy and covered with an aluminum ($Al_2O_3$) refractory tube 18 except for a tip portion 19 thereof, and a stainless steel sleeve 14 having a length of 200 mm.

In addition, there was prepared a temperature sensor 11 within the scope of the present invention as shown in FIG. 3 (hereinafter referred to as the "sample of the invention") No. 3, which was substantially identical with the samples of the invention Nos. 1, 2 and 4 except that a sheathed thermocouple 13, the whole of which was enveloped in a magnesia (MgO) refractory, and further covered with a stainless steel tube, was employed.

For comparison purposes, there were prepared temperature sensors outside the scope of the present invention (hereinafter referred to as the "samples for comparison") Nos. 5 and 6, each of which comprised a protecting tube made of a molybdenum-zirconia (Mo-$ZrO_2$) refractory having a chemical composition outside the scope of the present invention as shown in Table 1 and having dimensions including a length of 80 mm, an outside diameter of 6 mm and an inside diameter of 4 mm, a thermocouple comprising platinum and a platinum-rhodium alloy and covered with an aluminum ($Al_2O_3$) refractory tube except for a tip portion thereof, and a stainless steel sleeve having a length of 200 mm.

In addition, there was prepared a conventional temperature sensor 1 outside the scope of the present invention as shown FIGS. 1 and 2 (hereinafter referred to as the "sample for comparison") No. 7, which comprised a quartz glass protecting tube 6, a thermocouple 4, 5 comprising platinum and a platinum-rhodium alloy, and a cap 10.

A pig iron ingot weighing 30 kg was melted in an induction heating furnace, and each of the samples of the invention Nos. 1 to 4 and the samples for comparison Nos. 5 to 7 was repeatedly immersed into the resultant molten pig iron at a temperature within a range of from 1,410° to 1,450° C. to repeatedly measure temperature of the molten pig iron. Then, a steel ingot weighing 30 kg was melted in an induction heating furnace, and each of the samples of the invention Nos. 1 to 4 and the samples for comparison Nos. 5 to 7 was repeatedly immersed into the resultant molten steel at a temperature within a range of from 1,540° to 1,570° C. to repeatedly measure temperature of the molten steel. These results are also shown in Table 1. In Table 1, the number of runs of measurement during the service life represents an average over values obtained from ten pieces of each sample.

TABLE 1

|  | Sample of the invention | | | | Sample for comparison | | |
| --- | --- | --- | --- | --- | --- | --- | --- |
|  | No. 1 | No. 2 | No. 3 | No. 4 | No. 5 | No. 6 | No. 7 |
| Chemical composition of protecting tube (wt. %) | | | | | | | |
| Molybdenum | 50 | 75 | 75 | 90 | 3 | 97 | — |
| Zirconia | 50 | 25 | 25 | 10 | 97 | 3 | — |
| Quartz glass | — | — | — | — | — | — | 100 |
| Number of runs of measurement during service life | | | | | | | |
| Molten pig iron (1,410–1,450° C.) | 282 | 310 | 209 | 113 | 9 | 28 | 1 |
| Molten steel (1,540–1,570° C.) | 200 | 211 | 153 | 87 | 12 | 21 | 1 |

As is clear from Table 1, in the sample for comparison No. 7 of the prior art using the quartz glass protecting tube, molten metal penetrated into the quartz glass protecting tube after only a sngle run of measurement for a short period of time, resulting in break-down of the thermocouple. In the sample for comparison No. 5, which had a low molybdenum content and a high zirconia content in the protecting tube made of the molybdenum-zirconia refractory, both being outside the scope of the present invention, as well as in the sample for comparison No. 6, which had a high molybdenum content and a low zirconia content in the protecting tube made of the molybdenum-zirconia refractory, both being outside the scope of the present invention, molten metal penetrated into the protecting tube made of the molybdenum-zirconia refractory after only a few runs of measurement, resulting in break-down of the thermocouple in all cases.

In the samples of the invention Nos. 1 to 4, in contrast, it was possible to carry out multiple runs of measurement of temperature of a molten metal for a long period of time in all cases. The samples of the invention Nos. 1 to 4 gave a temperature measuring accuracy of ±4° C.

According to the immersion-type temperature measuring apparatus of the present invention, as described above in detail, it is possible to carry out multiple runs of measurement of temperature of a melt such as a molten metal or a molten slag in a furnace such as an induction heating furnace for a long period of time with the use of a single temperature sensor, and to easily replace the temperature sensor, thus providing many industrially useful effects.

What is claimed is:

1. In an immersion-type temperature measuring apparatus using a thermocouple for measuring temperature of a melt, which comprises:

a replaceable cartridge-type temperature sensor (11) for detecting a thermoelectromotive force corresponding to a temperature of a melt, said temperature sensor (11) comprising a thermocouple (13), a protecting tube (12) covering at least a lower portion of said thermocouple (13), for protecting said thermocouple (13) from said melt, and a connector (16);

a holder (26) for releasably supporting said temperature sensor (11);

a measuring instrument (28) for processing said thermoelectromotive force detected by said temperature sensor (11) to determine the temperature of said melt; and an extension lead wire (25), arranged through said holder (26), for connecting said temperature sensor (11) with said measuring instrument (28), said extension lead wire (25) being connected with said temperature sensor (11) through said connector (16);

the improvement wherein:

said protecting tube (12) which protects said thermocouple (13) comprises an outer layer and an inner layer, said outer layer is formed of a molybdenum-zirconia (Mo-ZrO$_2$) refractory which consists essentially of:

molybdenum (Mo): from 20 to 95 wt. %, and zirconia (ZrO$_2$): from 5 to 80 wt. %, and said inner layer is comprised of an alumina (Al$_2$O$_3$) refractory.

2. An immersion-type temperature measuring apparatus as claimed in claim 1, wherein:

the whole of said thermocouple (13) is enveloped in any one of a magnesia (MgO) refractory and an alumina (Al$_2$O$_3$) refractory.

3. An immersion-type temperature measuring apparatus as claimed in claim 2, wherein:

the whole of said thermocouple (13), which is enveloped in any one of said magnesia (MgO) refractory and said alumina (Al$_2$O$_3$) refractory, is further covered with a stainless steel tube.

4. An immersion-type temperature measuring apparatus as claimed in claim 1, wherein:

said thermocouple (13) is covered with an alumina (Al$_2$O$_3$) refractory tube (18), except for a tip portion (19) of said thermocouple (13).

* * * * *

UNITED STATES PATENT AND TRADEMARK OFFICE
CERTIFICATE OF CORRECTION

PATENT NO. : 5,360,269

DATED : November 1, 1994

INVENTOR(S) : OGAWA et al

It is certified that error appears in the above-identified patent and that said Letters Patent is hereby corrected as shown below:

Title page:

Item [73] Assignee, "Kogyo" should be --Yogyo--

Beneath Item [22], insert:

--[30]   Foreign Application Priority Data
        Jan. 29, 1993 [JP] Japan .....5-34,033--

Signed and Sealed this

Twenty-ninth Day of August, 1995

Attest:

BRUCE LEHMAN

*Attesting Officer*         *Commissioner of Patents and Trademarks*